US009425983B2

(12) United States Patent
Trojer et al.

(10) Patent No.: US 9,425,983 B2
(45) Date of Patent: Aug. 23, 2016

(54) METHOD AND AN INTERCONNECTING NODE FOR USE IN AN ACCESS NETWORK

(75) Inventors: Elmar Trojer, Täby (SE); Per-Erik Eriksson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 623 days.

(21) Appl. No.: 13/143,513

(22) PCT Filed: Jan. 16, 2009

(86) PCT No.: PCT/SE2009/050036
§ 371 (c)(1),
(2), (4) Date: Jul. 6, 2011

(87) PCT Pub. No.: WO2010/082879
PCT Pub. Date: Jul. 22, 2010

(65) Prior Publication Data
US 2012/0020668 A1   Jan. 26, 2012

(51) Int. Cl.
*H04J 3/00* (2006.01)
*H04L 12/28* (2006.01)
(Continued)

(52) U.S. Cl.
CPC ......... *H04L 12/2885* (2013.01); *H04M 11/062* (2013.01); *H04Q 11/0067* (2013.01);
(Continued)

(58) Field of Classification Search
CPC ....... H04J 3/0632; H04J 14/00; H04J 3/0655; H04J 3/0673
USPC ................................................. 398/140, 165
See application file for complete search history.

(56) References Cited

U.S. PATENT DOCUMENTS 6,470,032 B2   10/2002   Dudziak et al.
6,647,210 B1 *  11/2003   Toyoda ................ H04J 3/1694
                                                                398/100
(Continued)

FOREIGN PATENT DOCUMENTS

CN        1244751 A     2/2000
CN     101001121 A     7/2007
(Continued)

OTHER PUBLICATIONS

"ATM cell." Focal Dictionary of Telecommunications, Focal Press. London: Routledge, 1999. Credo Reference. Web. Sep. 30, 2013.*
(Continued)

*Primary Examiner* — David Payne
*Assistant Examiner* — Tanya Motsinger

(57) ABSTRACT

The invention relates to an interconnecting node for use in interconnecting a passive optical network (PON) and a copper wire xDSL access network, wherein said interconnecting node comprises an optical network unit (ONU) arranged to be connected to an optical line termination (OLT) over the PON network; and at least one xDSL access device connectable to at least one user end xDSL equipment over the copper wire xDSL access network. The interconnecting node is characterized in that it further comprises a clocking interconnect between the ONU unit and the at least one xDSL access device arranged to distribute a clock signal obtained from optical network transmissions received in the ONU unit over the PON network to an timing reference input of the at least one xDSL access device. The invention also relates to a further interconnecting node, methods for use in interconnecting nodes, a central office optical network apparatus and an access network.

9 Claims, 7 Drawing Sheets

(51) Int. Cl.
*H04M 11/06* (2006.01)
*H04Q 11/00* (2006.01)
*H04J 3/06* (2006.01)

(52) U.S. Cl.
CPC ............. *H04J3/0647* (2013.01); *H04J 3/0652* (2013.01); *H04J 3/0682* (2013.01); *H04L 12/2892* (2013.01); *H04Q 11/0071* (2013.01)

(56) References Cited

U.S. PATENT DOCUMENTS

| | | | | |
|---|---|---|---|---|
| 6,665,315 | B1* | 12/2003 | Karasawa | H04J 3/0682 370/508 |
| 8,284,795 | B2* | 10/2012 | Peeters et al. | 370/465 |
| 8,712,244 | B2* | 4/2014 | Hasegawa et al. | 398/102 |
| 8,718,482 | B1* | 5/2014 | Roberts | H04B 10/27 398/102 |
| 2001/0040902 | A1* | 11/2001 | Rao | H04J 3/0682 370/519 |
| 2002/0171895 | A1* | 11/2002 | Chang | H04J 3/0682 398/168 |
| 2003/0039273 | A1* | 2/2003 | Jang | H04J 3/0682 370/519 |
| 2003/0200551 | A1* | 10/2003 | Kang | H04M 11/062 725/120 |
| 2004/0125886 | A1* | 7/2004 | Berard | H04W 52/24 375/296 |
| 2004/0136534 | A1* | 7/2004 | Stiscia | H04L 63/0428 380/256 |
| 2004/0153771 | A1* | 8/2004 | Sund | H04J 3/0632 714/22 |
| 2004/0160905 | A1* | 8/2004 | Bernier | H04W 88/00 370/310 |
| 2005/0286424 | A1* | 12/2005 | Peeters | H04B 3/462 370/235 |
| 2006/0029332 | A1* | 2/2006 | Chiu et al. | 385/53 |
| 2008/0056721 | A1* | 3/2008 | Mori | 398/100 |
| 2008/0089685 | A1* | 4/2008 | Kazawa et al. | 398/66 |
| 2009/0046857 | A1* | 2/2009 | Nambu et al. | 380/255 |
| 2009/0180783 | A1* | 7/2009 | Huang et al. | 398/155 |
| 2009/0274463 | A1* | 11/2009 | Bernard | H04J 3/0632 398/72 |
| 2010/0074278 | A1* | 3/2010 | Dobjelevski | H04J 3/0697 370/503 |
| 2010/0085989 | A1* | 4/2010 | Belhadj | H04J 3/0667 370/503 |
| 2010/0085990 | A1* | 4/2010 | Belhadj | H04J 3/0667 370/517 |
| 2010/0098433 | A1* | 4/2010 | Boyd | H04J 3/0658 398/155 |
| 2010/0166419 | A1* | 7/2010 | Elmoalem | H04Q 11/0067 398/2 |
| 2010/0183316 | A1* | 7/2010 | Gordon | H04J 3/0682 398/149 |
| 2010/0310255 | A1* | 12/2010 | Trojer | H04B 10/808 398/58 |
| 2011/0286560 | A1* | 11/2011 | Pignatelli | 375/356 |
| 2011/0305455 | A1* | 12/2011 | Helleberg Andersen et al. | 398/41 |
| 2012/0020417 | A1* | 1/2012 | Wei | H04J 3/0638 375/259 |
| 2012/0020668 | A1* | 1/2012 | Trojer | H04M 11/062 398/115 |
| 2012/0057865 | A1* | 3/2012 | Hasegawa | H04J 3/0655 398/16 |
| 2012/0082449 | A1* | 4/2012 | Zheng | H04J 3/0682 398/25 |
| 2012/0230675 | A1* | 9/2012 | Zhang | H04J 3/0682 398/25 |
| 2012/0288280 | A1* | 11/2012 | Sui | 398/66 |
| 2013/0266306 | A1* | 10/2013 | Kozaki et al. | 398/5 |
| 2013/0294597 | A1* | 11/2013 | Shi | H04L 7/0041 379/406.01 |
| 2014/0226984 | A1* | 8/2014 | Roberts et al. | 398/66 |

FOREIGN PATENT DOCUMENTS

| | | | | |
|---|---|---|---|---|
| EP | 1 164 730 A | | 12/2001 | |
| JP | 2007 295151 A | | 11/2007 | |
| JP | 2007295151 | * | 11/2007 | ............. H04L 12/44 |
| KR | 1020020013063 | * | 7/2006 | ............. H04B 10/27 |

OTHER PUBLICATIONS

"frame." Focal Dictionary of Telecommunications, Focal Press. London: Routledge, 1999. Credo Reference. Web. Sep. 30, 2013.*
Frank J Effenberger Motorola Networks United States of America: "DraftRevised Amendment 1 to G.984.3~ Gigabit-capable Passive Optical Networks (G-PON) Transmission Convergence Layer Specification (for consent); D438" ITU-T Draft Study Period 2005-2008, International Telecommunication Union, Geneva ; CH, vol. Study Group 15 J May 16, 2005, pp. 1-36, XP017407552 Introduction chapter IV.5.1 on p. 35.
Sasaki, et al. Mitsubishi Electric Develops 10 Gbps DWDM Transceiver Module for Optical Communication. Sep. 14, 2006. Retrieved from the internet: http://www.mitsubishielectric.com/news/2006/0914.pdf.

* cited by examiner

42 PIN Photo diode
43 Clock detection and recovery unit
44 PON framer circuitry

METHOD AND AN INTERCONNECTING NODE FOR USE IN AN ACCESS NETWORK

TECHNICAL FIELD

The invention relates in general to access networks, and in particular to a method and an interconnecting node for use in different access network environments. The invention also relates to a central office optical network apparatus and an access network.

BACKGROUND

There are several access network architectures used in the broadband market today; mobile based access networks, copper based access network systems and optical fibre access network systems are some examples.

An access network may refer to the series of data transport media, such as, space, wires, cables and active equipment spanning the distance between consumer/business data termination points and the local or regional exchanges. The exchanges may contain automated switching equipment in order to direct speech calls or data connections to the consumer/business to and from the end termination points.

In copper based access network systems generally used by telecom operators, telephone and broadband services are provided to customers by already existing direct copper wire connections that have been installed a long time ago for simple telephony services. Due to the age of and inherent loss and noise characteristics of the copper wires, modern broadband services such as high-speed Internet, and television over IP (IPTV) are limited by the available capacity of these connections.

Thus, over time, access networks around the world will evolve to include more and more optical fibre technology. Optical fibre access network systems already makes up the majority of core and metro networks and will most likely start to move closer and closer to the customers/businesses until, in the end, be arranged to deliver value added services over fibre to the home (FTTH), that is, a pure fibre architecture enabling high capacity communication between the customers/businesses and the central office over optical fibres. The interest in fibre based access technology has also increased significant due to the growing demand for higher speeds in order to enable triple play, higher competition amongst the network operators in the broadband market, and ever lower costs for optical components.

SUMMARY

A problem to which the invention relates is how to enable improved services in an access network.

The invention relates to an interconnecting node for use in interconnecting a passive optical network (PON) and a copper wire xDSL access network, wherein said interconnecting node comprises an optical network unit (ONU) arranged to be connected to an optical line termination (OLT) over the PON network; and at least one xDSL access device connectable to at least one user end xDSL equipment over the copper wire xDSL access network, characterised in that the interconnecting node comprises a clocking interconnect between the ONU unit and the at least one xDSL access device arranged to distribute a clock signal obtained from optical network transmissions received in the ONU unit over the PON network to an timing reference input of the at least one xDSL access device.

The invention also relates to a method for use in an interconnecting node comprising an ONU unit arranged to be connected to an OLT termination over a PON network, and at least one xDSL access device connectable to at least one user end xDSL equipment over a copper wire xDSL access network, characterized in comprising the steps of: receiving optical network transmissions in the ONU unit; obtaining a clock signal from the received optical network transmissions in the ONU unit; and distributing said clock signal to an timing reference input of the at least one xDSL access device.

The invention further relates to an interconnecting node comprising an ONU unit arranged to be connected to an OLT termination over a PON network; characterised in that the ONU unit is arranged to receive a time-of-day information and a zero-distance equalization delay from the OLT termination, determine a propagation delay, and update the received time-of-day information using the determined propagation delay.

The invention further relates to a central office optical network apparatus comprising an OLT termination arranged to be connected to at least one ONU unit via a PON network, characterized in that said OLT termination is arranged to transmit a time-of-day information and a zero-distance equalization delay to the at least one ONU unit over the PON network.

The invention further relates to an access network interconnecting a PON network and a copper wire xDSL access network, wherein access network comprises any one of the interconnecting nodes according to the above and/or a central office optical network apparatus according to the above.

By having a interconnecting node, which provides the optical network unit and the at least one xDSL access device with a shared clocking interface based on a physical layer synchronization of the optical network transmissions, allows for a highly accurate and reliable clock signal to be used in access networks at least partly employing traditional copper wiring. This enables a wider range of services and applications to be used in the access network, which previously was not possible, or severely restricted or running on the border of their functionality due to the limited clock accuracy of the access network.

Another advantage of the invention is that it may be used to offer clock signals with accuracies in the nanosecond range to perform clock synchronization of stations, such as, for example, a Radio Base Stations (RBSs) and/or VDSL2 equipment, attached to the access network. This is especially important in mobile communications systems, and particularly for services such as, for example, radio access network (RAN) backhauling, wherein high accuracy and reliability is a necessity.

A further advantage of the invention is that the physical layer synchronization using the optical network transmissions in the passive optical network is superior to any higher-layer clock synchronisation approach in both performance and simplicity.

The optical network unit in the interconnecting node may further comprise a Clock and Data Recovery (CDR) unit in order to obtain a bit-level clock signal. The Clock and Data Recovery (CDR) unit may determine the clock signal on a bit-level of the physical transport layer of the optical network transmissions. It follows that for a 2488.2 MBit/s downstream of which the bit duration is around 400 picoseconds (ps), the clock signal derived on a bit-level may be as accurate as half a nanosecond (½ ns).

The optical network unit in the interconnecting node may also comprise PON framer circuitry counter in order to obtain a frame-level clock signal. By using the inherent downstream framing structure of the physical transport layer of the optical network transmissions used in the communication over the optical distribution network, a reliable, 8 kHz clock signal may be determined by the PON framer circuitry. The clock signal derived from the PON framer circuitry may be as accurate as 125 microseconds (μs).

A further advantage of the above described invention is that it may be easily implemented in conventional access networks, and does note require a large amount of additional hardware or costs associated therewith to be added when implementing the invention.

Further advantageous embodiments of the interconnecting node and the method are set forth in the dependent claims, which correspondently describe further advantageous embodiments of the present invention.

BRIEF DESCRIPTION OF THE DRAWINGS

The invention will be described in more detail in the following with reference to the appended drawings, in which.

ABBREVIATIONS

ADSL Asymmetric Digital Subscriber line
BM Burst Mode
BNG Broadband Network Gateway
BPON Broadband PON
CDR Clock and Data Recovery
CPE Customer-premises equipment/Customer-provided equipment
DSL Digital Subscriber Line
DSLAM Digital Subscriber Line Access Multiplexer
EPON Ethernet PON
FE Fast Ethernet
FTTx Fiber To The X
GbE/GE Gigabit Ethernet
GEM GPON Encapsulation Method
GPON Gigabit PON
GTC GPON Transmission Convergence
IP Internet Protocol
MAC Media Access Control
MMF Multi-mode Fibre
NTR Network Timing Reference
ODN Optical Distribution Network
OLT Optical Line Termination
ONT Optical Network Termination
ONU Optical Network Unit
P2MP Point-to-Multipoint
P2P Point-to-Point
PCBd Physical Control Block downstream
PMD Physical Media Dependent function
PMS Physical Media Specific function
PON Passive Optical Networks
RBS Radio Base Station
SERDES Serialize-Deserialize
SMF Single Mode Fibre
SoC System-on-a-chip
SOA Semiconductor Optical Amplifiers
TC Transmission Convergence
TDM Time Division Multiplexing
TPC Twisted Pair Cable
VDSL Very high speed Digital Subscriber Line
WDM Wavelength Division Multiplexer
XGE 10 Gbit/s Gigabit Ethernet

DETAILED DESCRIPTION

Figure 1:
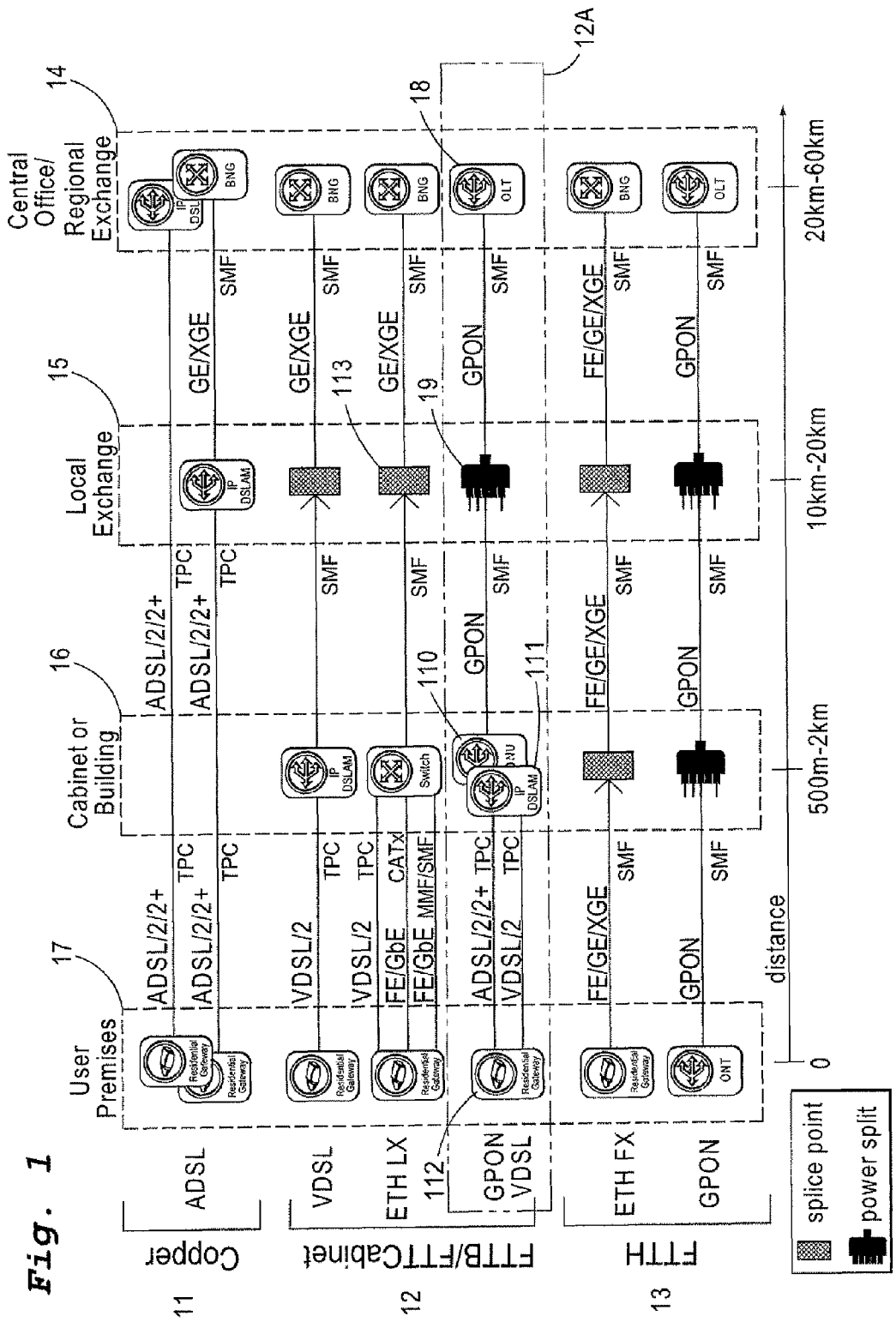
FIG. 1 shows the basic structure of some exemplary access network architectures.

FIG. 1 illustrates the basic structure of three general, exemplary access network architectures: copper network configurations 11, Fibre-to-the-Building (FTTB)/Fibre-to-the-Cabinet (FTTCab) network configurations 12, and pure fibre network configurations 13, i.e. Fibre-to-the-Home (FTTH).

The network configurations 11, 12, 13 commonly originate from regional exchanges 14, also referred to as a central offices (CO), which may provide broadband network access to one or several local exchanges 15. The regional exchanges or central offices (CO) 14 are generally located about 20 km to 60 km away from the broadband network user location 17, and the local exchanges 15 about 10 km to 20 km away. The local exchanges 15 may in turn be connected to one or several network access nodes (e.g. ONU 110 and IP DSLAM 111) located in, for example, cabinets or buildings 16, etc. The cabinets or buildings 16 are usually close to the broadband network user location 17, generally about 500 m to 2 km away. The one or several network access nodes 110, 111 in the cabinets or buildings 16 are arranged to further distribute network access to, for example, individual customers/businesses, etc., located at the broadband network user location 17, also referred to as user premises.

The copper network configurations 11 normally employ one of the ADSL/ADSL2/ADSL2+ protocols when providing broadband access to end users at the broadband network user location 17. The copper network configurations 11 are, however, limited to only provide bandwidths in the low Mbits/s-range due to the restrictions on the physical copper line. For example, noise and bit-loss of the copper line are dependent upon the actual length of the copper line. This also limits the possible range of the copper network configuration 11.

The pure fibre network configurations (FTTH) 13 may provide noise-free, high capacity access in the Gbits/s-range to users at the broadband network user location 17. However, providing point-to-point optical fibres between an end user at the broadband network user locations 17 and the regional exchange/central office (CO) 14 are extremely costly and requires a large amount of optical fibres to be dug down in the ground in order to reach each user at every broadband network end user location 17. It is in order to provide fiber-sparse architectures that passive optical network (PON) technology based on point-to-multipoint fiber structures exist.

The FTTB/FTTCab network configurations 12 can be described as a combination of, or bridge between, the copper network configurations 11 and the pure fibre network configurations (FTTH) 13. The FTTB/FTTCab network configurations 12 may employ one of the ADSL/ADSL2/ADSL2+/VDSL/VDSL2 protocols when providing broadband access to end users at the broadband network user location 17 over the copper wirings between the broadband network user location 17 and the one or several network access nodes 110, 111 in the cabinets or buildings 16. Between the one or several network access nodes 110, 111 in the cabinets or buildings 16 and the regional exchange/central office (CO) 14, the FTTB/FTTCab network configurations 12 may employ different optical network transmission protocols, such as, for example, for GE/XGE/GPON, etc., when backhauling traffic over the optical network therein between.

It should also be noted that although the above-mentioned access network configurations 11, 12, 13 may primarily be used to deliver services to residential and business customers that need high capacity, the access network configurations 11, 12, 13 may also be used to backhaul mobile traffic from various types of mobile networks, such as, for example, GSM, UMTS, HSPA, LTE, etc. In such cases, the FTTB/FTTCab configurations 12 are probably the most viable and useful solutions today, since copper lines can often be found already deployed close to any antenna or radio base station location. The combination of copper wires and optical fibre solutions may then be used to aggregate and backhaul the mobile traffic.

However, in the FTTB/FTTCab access networks (copper/optical fibre networks) some applications or services at the user side, using at least partly the copper wire network, are severely restricted or running on the border of their functionality. This is because of the limited clock accuracy of the access network. Reliable and accurate clocks are very important in mobile communications systems, particularly for applications or services such as, for example, radio access network (RAN) backhauling.

Conventionally, there are three ways of distributing a common clock in Ethernet-based networks, such as, in the copper wire configuration 11 and in parts of the FTTB/FTTCab network configurations 12 in FIG. 1. The clock synchronisation may be performed based on the physical layer, or on the L2 layer using the protocol IEEE 1588, or on the L3 layer using the Network Timing Protocol, NTP, RFC 1305.

According to the physical layer approach, clocks may be distributed using the physical layer if a synchronous protocol such as, for example, TDM, is used. Accuracy is here dependent on the transmission speed and may yield very high accuracies, that is, in the pico-second range (ps), e.g. about 1-10 ps. However, this may not be accomplished in an Ethernet-based network, since Ethernet-based networks almost always are based on an asynchronous frame transport.

According to the L2 synchronization approach, the recently standardized protocol IEEE 1588 may be used in order to distribute clock synchronisation. This protocol may, by using a master/slave principle for small LAN networks comprising several sub-nets, yield accuracies in the low microsecond (μs) range, for example, about 1-5 μs.

According to the L3 synchronization approach, clock synchronisation may be achieved using the Network Timing Protocol NTP (RFC 1305), which is an IP-based protocol for wide area networks (WANs), such as, for example, the Internet, working in a peer ensemble style. This approach supports accuracies in the few milliseconds range, that is, about 1-10 ms. However, unfortunately, neither of these approaches solves the problem stated above.

According to the inventive features of the invention, the problem is solved by providing a clocking interconnect between the passive optical network and the copper wire access network, and using the high precision in the synchronisation of the physical layer of the optical transmissions in order to provide an accurate and reliable timing reference for transmissions over the copper wire access network. This may then, for example, be used by the applications, services and equipment running on the user side as a more accurate and reliable clock. It should also be noted that although the invention is described in the following in relation to the FTTB/FTTCab access network 12A and 20, as shown in FIGS. 1 and 2, respectively, this should not be considered as limiting the invention.

Figure 2:
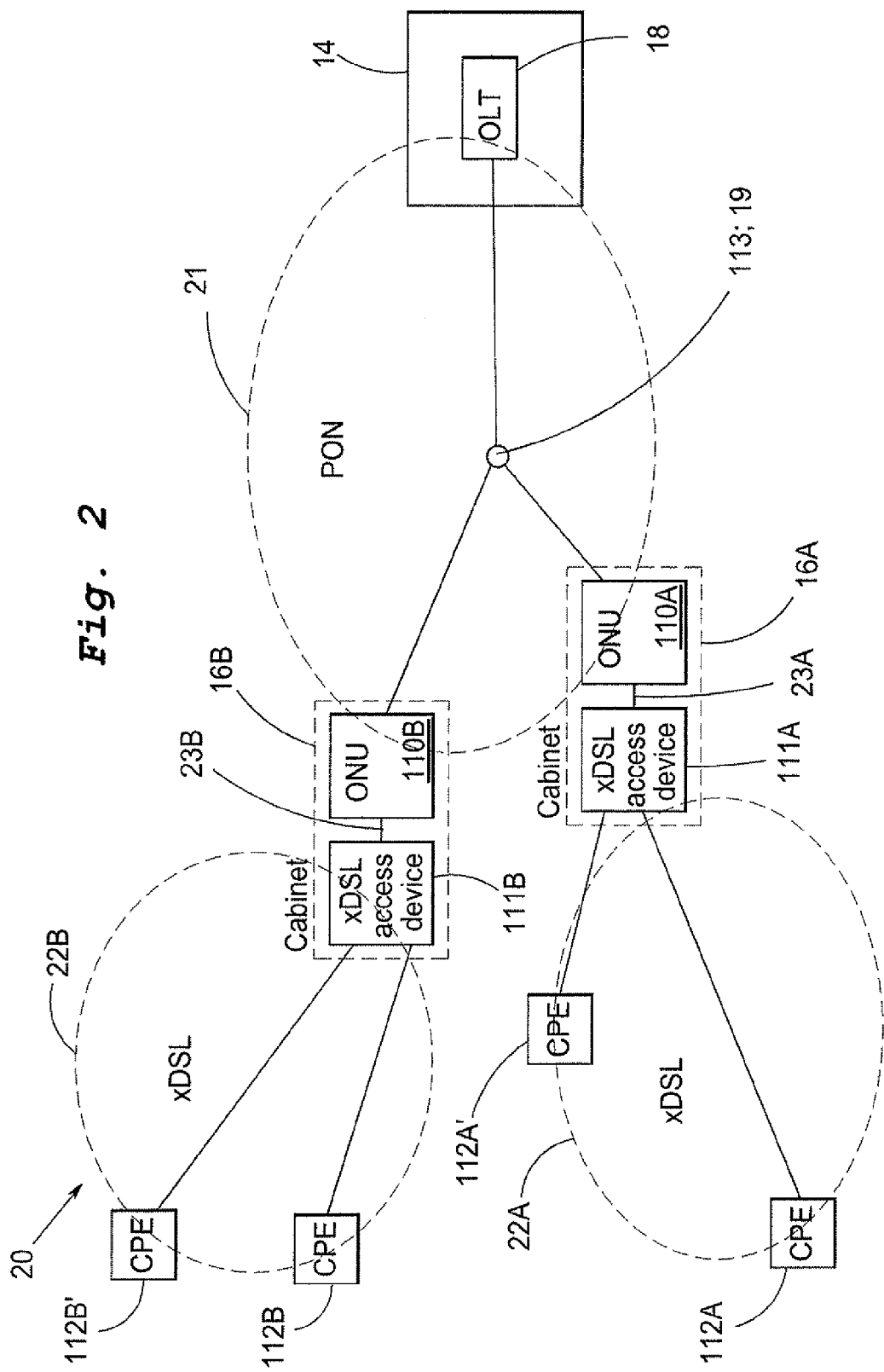
FIG. 2 shows an FTTB/FTTCab access network.

FIG. 2 shows an FTTB/FTTCab access network 20. The FTTB/FTTCab access network 20 may be divided into two main parts, the passive optical network (PON) 21 and the copper wire xDSL access network 22A, 22B.

The passive optical network 21 may, for example, be a point-to-point Ethernet, a point-to-multipoint Ethernet Passive Optical Network (EPON), a Gigabit-capable Passive Optical Network (GPON), etc. More details about passive optical networks, such as, the passive optical network 21 described herein, may be found in, for example, "Gigabit Small Form Factor Pluggable Module", XFP Revision 4.5, August 2005; "10 Gbps XFP-E with extended reach 80 km with DWDM option", Mitsubishi, February 2005; G652, "Characteristics of a single-mode optical fiber and cable", ITU-T, June 2005; G983.1, "Broadband optical access systems based on Passive Optical Networks (PON)", ITU-T, January 2005; G983.3, "A broadband optical access system with increased service capability by wavelength allocation", ITU-T, March 2001; G984.1, "Gigabit-capable Passive Optical Networks (GPON): General characteristics", ITU-T, March 2003; G984.2, "Gigabit-capable Passive Optical Networks (GPON): Physical Media Dependent (PMD) layer specification", ITU-T, March 2003; G984.3, "Gigabit-capable Passive Optical networks (GPON): Transmission convergence layer specifications", ITU-T, February 2004; IEEE 802.3ah, "EPON Standard"; and in IEEE P802.3av, "10 Gbit/s Ethernet Passive Optical Networks".

The copper wire xDSL access network 22A, 22B may, for example, be an ADSL-, ADSL2-, ADSL2plus- or VDSL2-network. More details about copper wire xDSL access networks, such as, the exemplary copper wire xDSL access network 22A, 22B described herein, may be found in, for example, G992.5, "Asymmetric Digital Subscriber Line (ADSL) transceivers—Extended bandwidth ADSL2 (ADSL2+)", ITU-T, January 2005; and in G993.2, "Very high speed digital subscriber line transceivers 2 (VDSL2)", ITU-T, March 2006.

In the passive optical network 21, the regional exchange/central office (CO) 14 may comprise an optical line termination (OLT) 18. The optical line termination (OLT) 18 may be arranged to provide a high-capacity optical network access to one or several optical network units 110A, 110B comprised in one or several interconnecting nodes 16A, 16B. It should however also be noted that one or several local exchanges 15, one or several splice points 113, and/or one or several power splits 19 may be provided in between the optical line termination 18 and the one or several optical network units 110A, 110B in the one or several interconnecting nodes 16A, 16B. The interconnecting nodes 16A, 16B are often located in buildings or cabinets relatively close to the end user premises 17, hence the use of the name FTTB/FTTCab access network.

The interconnecting nodes 16A, 16B may further comprise one or several xDSL access devices 111A, 111B. The xDSL access device 111A, 111B may, for example, be a IP Digital Subscriber Line Access Multiplexer (DSLAM). The xDSL access device 111A, 111B may be arranged to be connected to and to provide network access to one or several user xDSL equipments 112, 112A, 112A', 112B, 112B' over the copper wire xDSL access network 22A, 22B. The one or several user xDSL equipments 112, 112A, 112A', 112B, 112B' may also be referred to as customer-premises equipment or customer-provided equipment (CPEs). The xDSL access device 111A, 111B and the optical network unit 110A, 110B in the interconnecting node 16A, 16B, may, for example, be implemented in separate boxes and arranged to connect via an Ethernet-interface, or implemented and arranged to be connected in the same box or on the same printed board assembly.

According to the invention, a clocking interconnect 23A, 23B is provided between the xDSL access device 111A, 111B and the optical network unit 110A, 110B in the interconnecting node 16A, 16B. The clocking interconnect 23A, 23B may be implemented, for example, as an on-board connection via a conductive lane on a printed circuit board assembly. This may be preferable if the xDSL access device 111A, 111B and the ONU unit 110A, 110B are implemented in the same box or on the same printed board assembly in the interconnecting node 16A, 16B. The clocking interconnect 23A, 23B may also be implemented, for example, as a separate copper connection or an inband signal via an Ethernet link. This may be preferable if the xDSL access device 111A, 111B and the ONU unit 110A, 110B are implemented in separate boxes and connects via an Ethernet-interface in the interconnecting node 16A, 16B. As will be described in the following with reference to FIGS. 3-5, this allows the ONU unit 110A, 110B in the interconnecting node 16A, 16B to provide it's more reliable and accurate clock signal, obtained through the high precision in the synchronisation of the physical layer of optical transmissions, to the xDSL access device 111A, 111B and the copper wire xDSL access network 22A, 22B.

Figure 3:
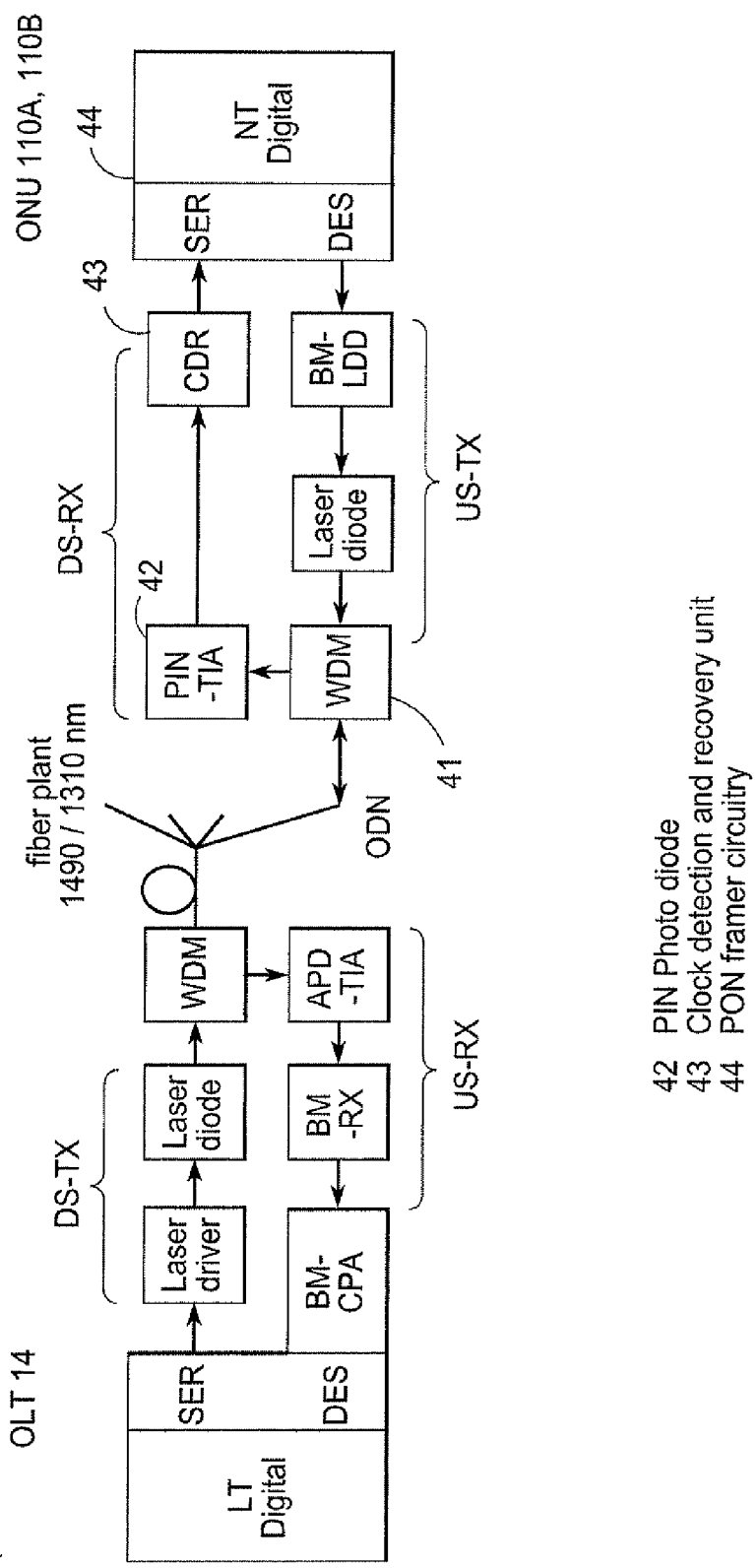
FIG. 3 shows a block diagram of a PON network, an OLT and an ONU according to an exemplary embodiment of the present invention.

FIG. 3 shows an illustrative exemplary block diagram describing a PON network 21, an OLT 14 and an ONU 110A, 110B in more detail. It should be noted that most of the units shown in the OLT 14 and the ONU 110A, 110B in FIG. 3 are known, and will therefore not be described in particular detail.

The Wavelength Division Multiplexing (WDM) receiving unit 41 may receive optical transmissions over the optical fibre distribution network (ODN) located between the OLT 14 and the ONU 110A, 110B. The optical transmissions is forwarded to a photo diode 42 which may interpret the optical transmissions into continuous-mode bit-level modulated transmission signals, and output said continuous-mode bit-level modulated transmission signal to a Clock and Data Recovery (CDR) unit 43. The CDR unit 43 may be arranged to receive the continuous-mode bit-level modulated transmission signal and output a bit-level clock signal. According an embodiment of the invention, the ONU unit 110, 110A, 110B may be arranged to output this bit-level clock signal, for example, through the clocking interconnect 23A, 23B described above with reference to FIG. 2, and/or through an ONU interface having a signal output arranged to output the obtained bit-level clock signal. The ONU interface in the ONU unit 110, 110A, 110B may also enable further attached equipment and systems to be synchronized using the bit-level clock signal obtained by the CDR unit 43. The CDR unit 43 may also, for example, output said bit-level clock signal to PON framer circuitry 44 along with recovered data from the continuous-mode bit-level modulated transmission signal.

Additionally, the PON framer circuitry 44 in the ONU unit 110, 110A, 110B may further be arranged to obtain a frame-level clock signal from the data received from the CDR unit 43. The PON framer circuitry 44 may determine the frame-level clock signal from the downstream framing structure of the physical transport layer of the optical network transmissions. This will be discussed in more detail below with reference to FIG. 4. According to a further embodiment of the invention, the PON framer circuitry 44 in the ONU unit 110, 110A, 110B may be arranged to output the frame-level clock signal, for example, through the clocking interconnect 23A, 23B described above with reference to FIG. 2, and/or through an ONU interface having a signal output arranged to output the obtained frame-level clock signal. The ONU interface in the ONU unit 110, 110A, 110B may also enable further attached equipment and systems to be synchronized using the obtained frame-level clock signal. The PON framer circuitry 44 may also comprise a SERDES unit arranged to de-serialize input signals and serialize output signals.

It should also be understood that this embodiment may be included in the previous embodiment, such that the ONU unit 110, 110A, 110B may be arranged to output either of the bit-level clock signal or the frame-level clock signal through, for example, the clocking interconnect 23A, 23B described above with reference to FIG. 2, and/or through an ONU interface having a signal output arranged to output the obtained bit-level clock signal or frame-level clock signal. The ONU interface in the ONU unit 110, 110A, 110B may then also enable further attached equipment and systems to be synchronized using the obtained bit-level clock signal or frame-level clock signal.

Figure 4:
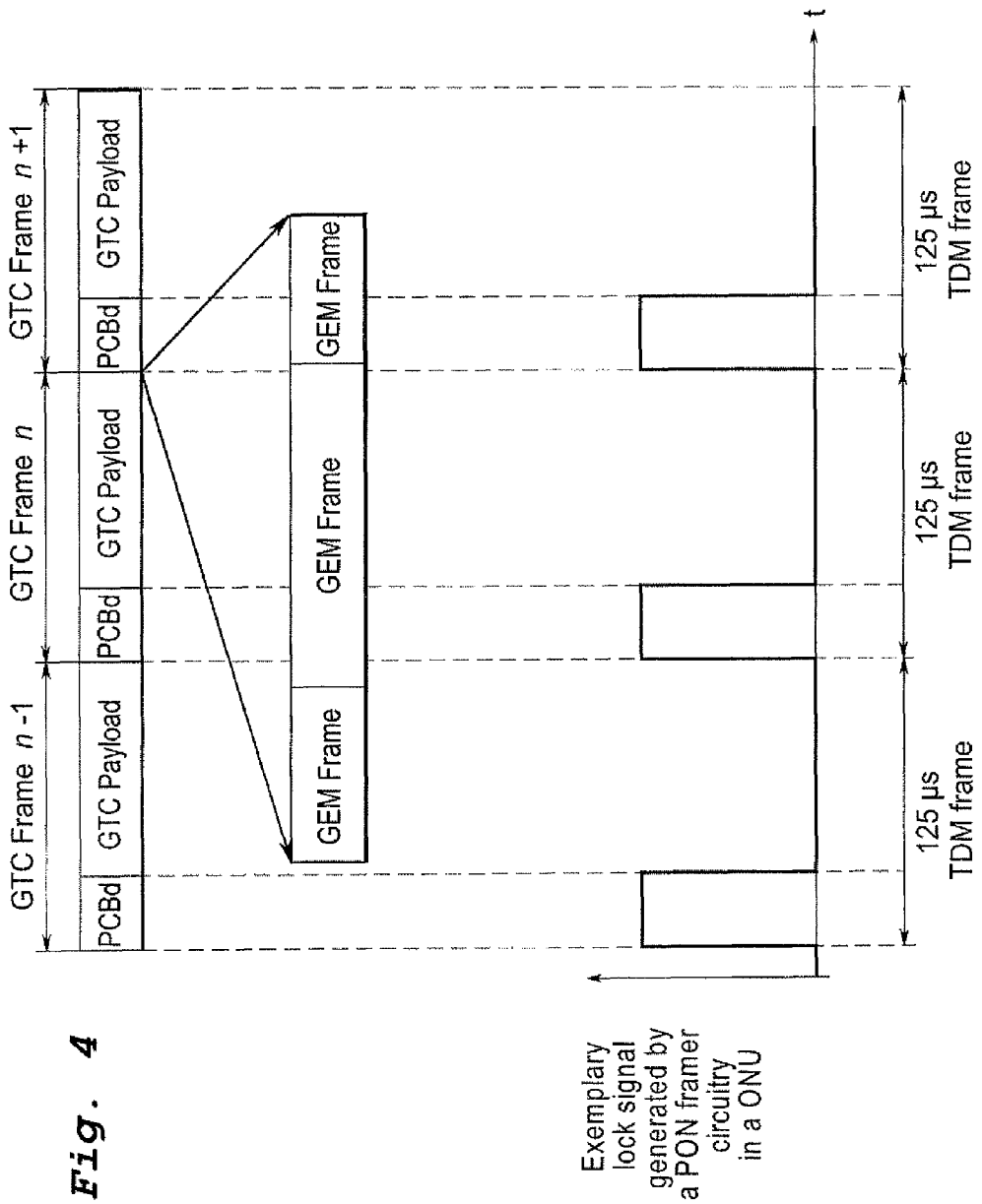
FIG. 4 shows a frame trail of the GPON Transmission Convergence (GTC) protocol and an exemplary lock signal in an interconnecting node according to an embodiment of the invention.

FIG. 4 illustrates an exemplary frame trail of the GPON Transmission Convergence (GTC) protocol as specified in G984.3, "Gigabit-capable Passive Optical networks (GPON): Transmission convergence layer specifications", ITU-T, February 2004, and an exemplary lock signal which may be obtained as a frame-level clock signal in an interconnecting node 16A, 16B according to an embodiment of the invention, for example, in the PON framer circuitry 44 in the ONU unit 110, 110A, 110B.

Since a GPON network uses a TDM protocol structure for optical network transmissions downstream and a TDMA protocol structure for optical network transmissions upstream, the OLT 18 and ONU units 110, 110A, 110B are always fully synchronized anytime an active link is established over the GPON network. Therefore, a common clock may be derived from the optical network transmissions by a PON framer circuitry 44 in any of the ONU units 110, 110A, 110B in the GPON network. To in this manner determine a clock synchronisation in an access network may yield clock accuracies in the low picoseconds range (e.g. 1-10 ps) within a GPON network. According to the inventive features of the invention, this clock signal may be used to synchronise any equipment connected to ONU units 110, 110A, 110B in the GPON network, such as, for example, the xDSL access device 111A, 111B in a FTTB/FTTCab scenario.

It should also be noted that in a GPON network, all ONU units 110, 110A, 110B may be synchronised to the OLT 18 of the GPON network via the downstream framing structure. Moreover, an upstream burst synchronisation may be derived from this downstream synchronisation. This allows for fully synchronous applications, such as, for example, TDM traffic backhauling and global timing distribution, which may be needed for performing backhauling of mobile network traffic from mobile communications radio base stations (RBSs).

A downstream frame trail for network transmission over the GPON network is illustrated in FIG. 4. This downstream frame trail is described in more detail in the GPON Transmission Convergence (GTC) protocol as specified in G984.3, "Gigabit-capable Passive Optical networks (GPON): Transmission convergence layer specifications", ITU-T, February 2004. The payload in a GTC frame contains a GPON encapsulation Method (GEM) payload, which in turn may comprise Ethernet data traffic. Each GTC frame in the exemplary GTC frame trail is commonly prefixed by a Physical Control Block downstream (PCBd) header. The presence of a PCBd header may be used to trigger the lock signal in the PON framer circuitry 44 in the ONU unit 110, 110A, 110B, as can be seen in FIG. 4.

Each GTC frame in the GTC frame trail may be received and decoded by all ONU units 110, 110A, 110B on the GPON network, which is due to the optical tree architecture (as seen in FIG. 2). The GTC frame duration is given by 125 microseconds (µs), which corresponds to a frame rate of 8 kHz. It follows that a frame-level clock derived according to the invention from the PON framer circuitry 44 in the ONU units 110, 110A, 110B, thus may be as accurate as 125 microseconds (µs). In comparison, a bit-level clock derived according to the invention from the CDR unit 43 in the ONU units 110, 110A, 110B may, for a 2488.32 Mbit/s downstream data rate wherein the bit duration is about 400 picoseconds (ps), be as accurate as, for example, half a nano-second (ns).

Figure 5:
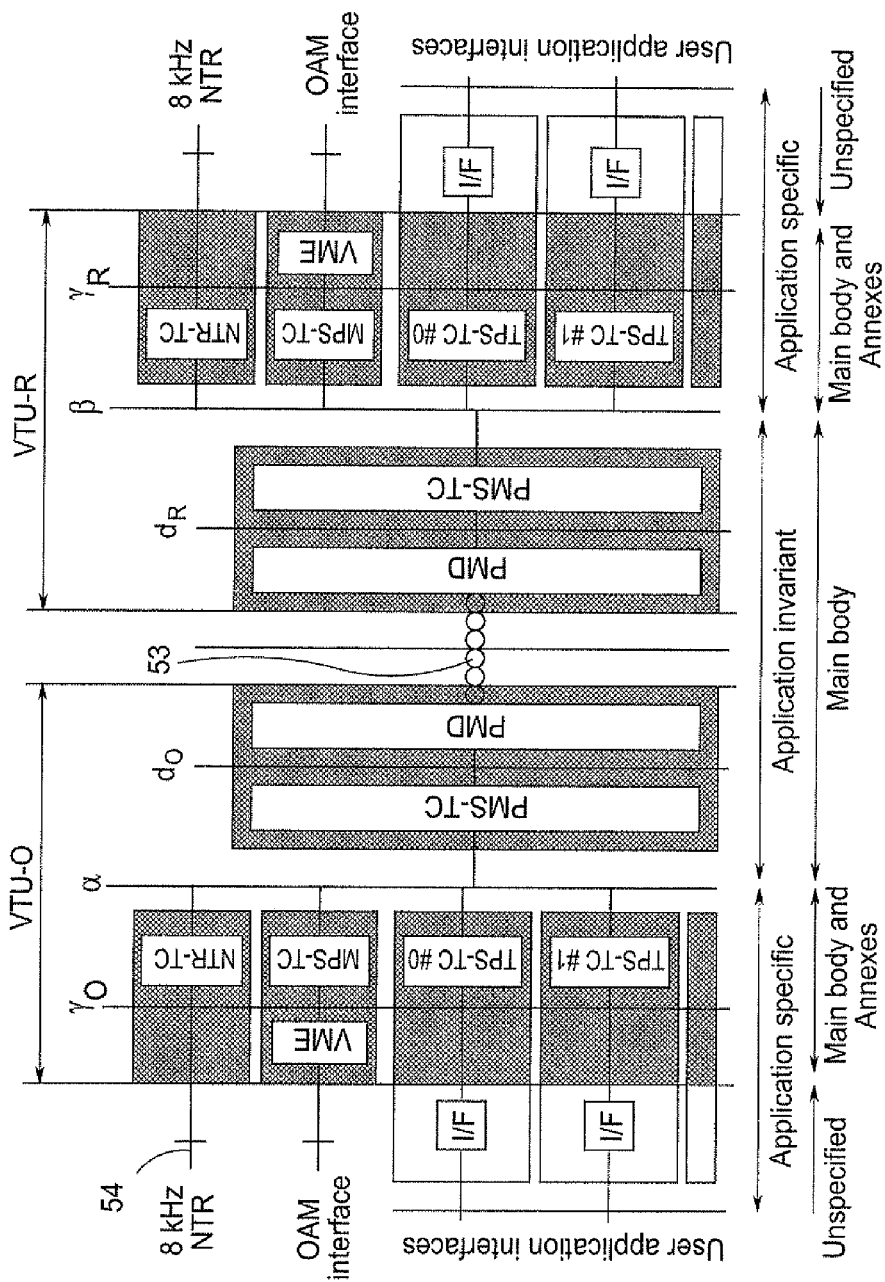
FIG. 5 shows a VDSL2 and VTU functional model.

FIG. 5 shows an exemplary VDSL2 and VTU functional model which may be used in the copper wire xDSL access network 22A, 22B. The VDSL2 and VTU functional model is described in more detail in G993.2, "Very high speed digital subscriber line transceivers 2 (VDSL2)", ITU-T, March 2006, and comprises a Network Timing Reference (NTR) functionality which is arranged to provide an 8 kHz timing marker to be transmitted over the copper wire xDSL access network 22A, 22B in the xDSL Over Head frame. The Network Timing Reference (NTR) functionality is also found in, for example, ADSL (ITU-T G.992.1), ADSL2 (ITU-T G.992.3) and ADSL2plus (ITU-T G.992.5).

The NTR 8 kHz timing marker 54 may be used in order to generate an 8 kHz clock accessible at an NTR output of the xDSL transceiver chip (xTU C) in the user xDSL equipments 112, 112A, 112A', 112B, 112B' or CPEs located at the user premises 17. The xTU C may also generate an 8 kHz local timing reference (LTR) by dividing its sampling clock by the appropriate integer. The resulting user premises NTR 8 kHz timing marker may then be generated by computing the change in phase offset between the input NTR 8 kHz timing marker 54 received from the xDSL access device 111, 111A, 111B and the LTR. The phase offset may be measured as a difference in cycles of the sampling clock. The phase offset may then be encoded into a single octet and inserted into a returning DSL Over Head frame by the user xDSL equipments 112, 112A, 112A', 112B, 112B' or CPEs at the user premises 17.

The NTR 8 kHz timing marker 54 of the xDSL access device 111, 111A, 111B may thus, through the clocking interconnect 23A, 23B according to the invention, be synchronised using the bit-level or frame-level clock signal obtained from the optical network transmissions received in the ONU unit 110, 110A, 110B over the PON network 21. This will allows for a highly accurate and reliable clock signal to be used in the xDSL access network 22A, 22B employing traditional copper wiring 53.

Figure 6:
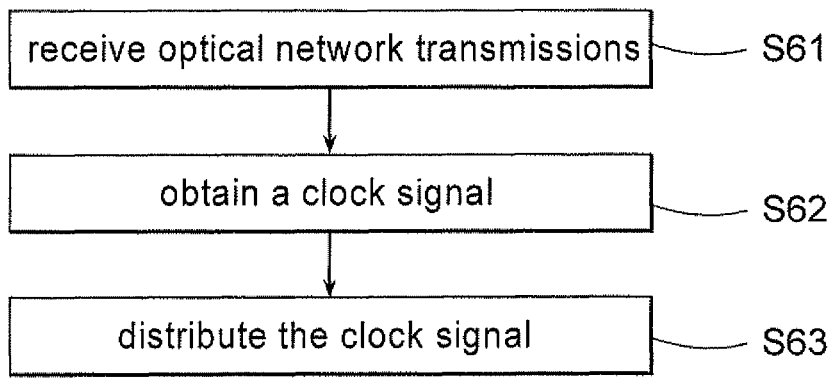
FIG. 6 is a flowchart of a method for use in an interconnecting node according to an exemplary embodiment of the invention.

FIG. 6 shows a flowchart illustrating an exemplary embodiment of the invention. In step S61, an ONU unit 110, 110A, 110B in an interconnecting node 16A, 16B may receive optical network transmissions from an OLT 18 over a PON network 21.

In step S62, the ONU unit 110, 110A, 110B may obtain a clock signal from the received optical network transmissions. The clock signal may be a frame-level clock signal or a bit-level clock signal, which may be obtained as described in the above mentioned embodiments.

In step S63, the ONU unit 110, 110A, 110B may distribute the clock signal to a timing reference input 54 of the at least one xDSL access device 111, 111A, 111B. The ONU unit 110, 110A, 110B may distribute the clock signal using the clocking interconnect 23A, 23B as described in the above mentioned embodiments.

Alternatively, the ONU unit 110, 110A, 110B may also distribute the clock signal to an ONU interface having a signal output, which may be arranged to output said obtained clock signal. This may, for example, be used to synchronize further attached equipment and systems.

Figure 7:
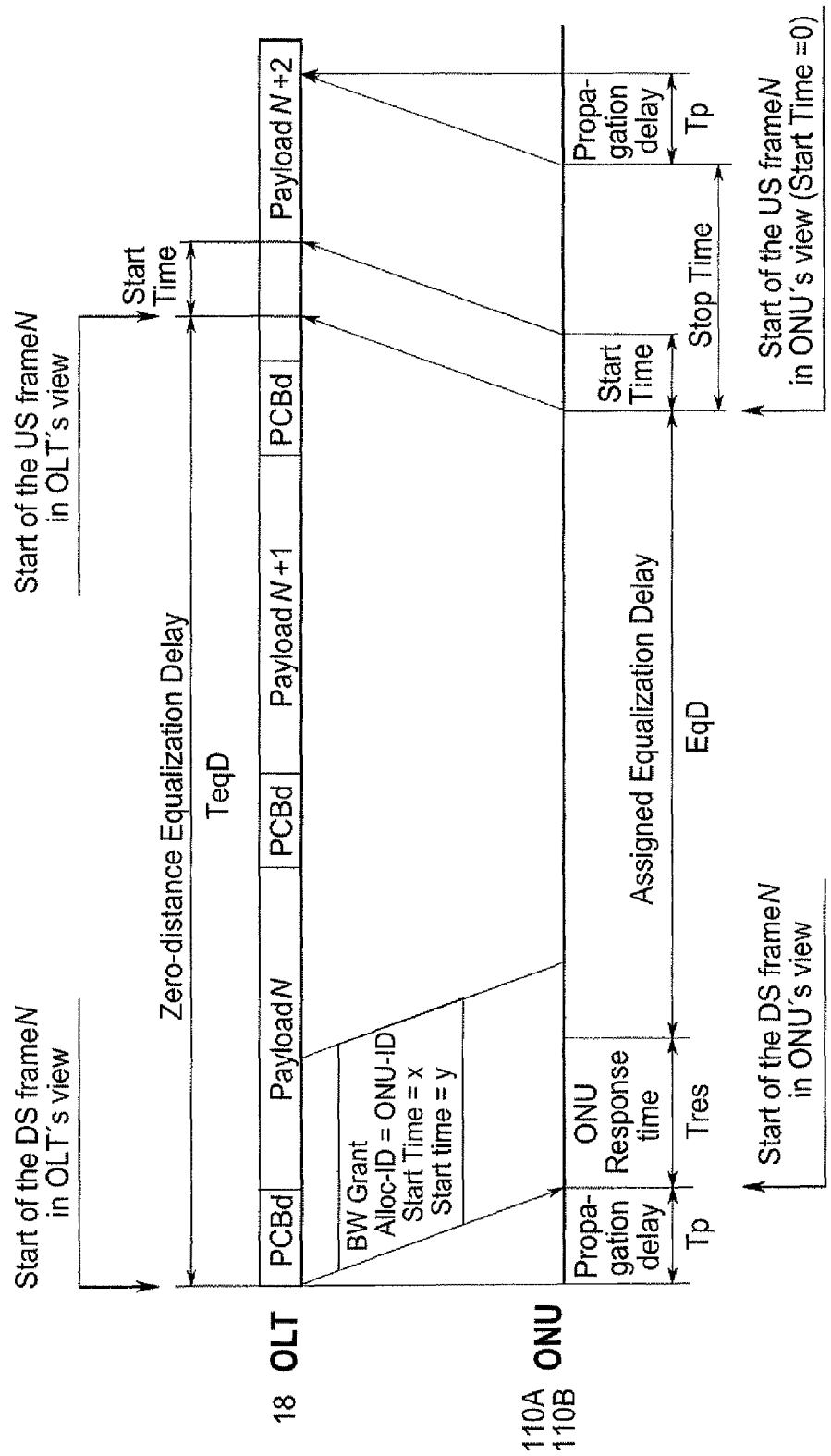
FIG. 7 shows a timing relationship schedule between an optical line termination (OLT) and an optical network unit (ONU) over a PON network.

FIG. 7 shows a timing relationship schedule as specified in G984.3, "Gigabit-capable Passive Optical networks (GPON): Transmission convergence layer specifications", ITU-T, February 2004, between an OLT 18 and an ONU unit 110, 110A, 110B over a PON network 21. In order to achieve an even more reliable and accurate clock in the access network, a time distribution mechanism is described in the following with principal reference to FIG. 7.

In FIG. 7, the zero-distance equalization delay $T_{eqD}$ is composed of two times the propagation delay $T_p$ from the OLT 18 to a particular ONU unit 110, 110A, 110B over a PON network 21, the ONU unit response time $T_{res}$ and the assigned equalization delay (EqD). The assigned equalization delay EqD may be computed by the OLT 18 during ranging in the PON network 21, and messaged to each ONU unit 110, 110A, 110B in order the achieve an upstream frame alignment at the OLT 18. According to the invention, a more accurate and reliable clock may be achieved at the ONU unit 110, 110A, 110B by synchronising the time of the day (ToD) information in the ONU unit 110, 110A, 110B to the global OLT clock.

In order to set the ToD information at each ONU unit 110, 110A, 110B correctly, the ONU unit 110, 110A, 110B must update its local clock to ToD+$T_p$ upon reception of the downstream frame (i.e. start of the frame). Since the OLT 18 does not know the ONU unit response time $T_{res}$ (but knows zero-distance equalization delay $T_{eqD}$ and assigned equalization delay EqD), this may be performed according to the invention by having the OLT 18 send the zero-distance equalization delay $T_{eqD}$ and assigned equalization delay EqD, for example, $T_{eqD}$–EqD or the $T_{eqD}$ and EqD separately, to the ONU unit 110, 110A, 110B. The ONU unit 110, 110A, 110B may then compute the propagation delay $T_p$ according to Eq. 1:

$$T_p = \tfrac{1}{2} \cdot (T_{eqD} - EqD - T_{res}). \tag{Eq.1}$$

This is because the ONU unit 110, 110A, 110B knows the ONU unit response time $T_{res}$. As the propagation delay $T_p$ has been calculated, the ONU unit 110, 110A, 110B may upon reception of the following downstream frame, comprising ToD information, update its clock to ToD+$T_d$ to get synchronized with the global OLT clock. According to this approach, a clock accuracy of 1 µs is possible (due to the 1 µs GPON ranging accuracy requirement).

Figure 8:
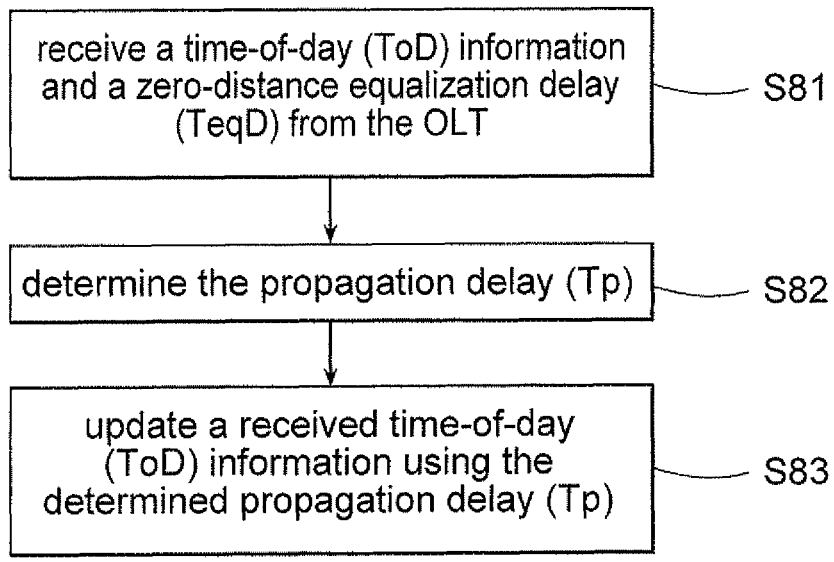
FIG. 8 is a flowchart of a method for use in an interconnecting node according to another exemplary embodiment of the invention.

FIG. 8 shows a flowchart illustrating an exemplary embodiment of the invention. In step S81, an ONU unit 110, 110A, 110B in an interconnecting node 16A, 16B receives a time-of-day (ToD) information and a zero-distance equalization delay $T_{eqD}$ from the OLT 18 in a downstream frame of an optical network transmission.

In step S82, the ONU unit 110, 110A, 110B may determine the propagation delay $T_p$. The propagation delay $T_p$ may be determined according to Eq.1 as described above.

In step S83, the ONU unit 110, 110A, 110B may update received time-of-day (ToD) information, which may be received from the OLT 18 in another downstream frame of the optical network transmission, using the determined propagation delay ($T_p$).

It should be noted that the time distribution mechanism described above with reference to FIGS. 7 and 8 provides an accurate and simple clock synchronisation of the time-of-day (ToD) information in the ONU unit 110, 110A, 110B.

The description above is of the best mode presently contemplated for practising the invention. The description is not intended to be taken in a limiting sense, but is made merely for the purpose of describing the general principles of the invention. The scope of the invention should only be ascertained with reference to the issued claims.

The invention claimed is:

1. An interconnecting node for use in interconnecting a passive optical network (PON) and a copper wire xDSL access network, wherein said interconnecting node comprises:
    an optical network unit (ONU) arranged to be connected to an optical line termination (OLT) over the PON network;
    at least one xDSL access device connectable to at least one user end xDSL equipment over the copper wire xDSL access network, and
    a clocking interconnect between the ONU unit and the at least one xDSL access device arranged to distribute a clock signal obtained from the rate of bits or frames of optical network transmissions received in the ONU unit over the PON network to a timing reference input of the at least one xDSL access device;
    wherein said timing reference input of the at least one xDSL access device is a Network Timing Reference (NTR) input on a transceiver chip in a xDSL Transmission Unit-Central (xTU-C);
    wherein, when the xDSL access device and the ONU unit are implemented in separate boxes and connects via an Ethernet-interface, said clocking interconnect between the ONU unit and the xDSL access device is either a separate copper connection or an inband signal via an Ethernet link; and
    wherein the ONU unit is arranged to receive a time-of-day (ToD) information and a zero-distance equalization delay ($T_{eqD}$) from the OLT, determine a propagation delay ($T_p$), and update the received time-of-day information using the determined propagation delay.

2. The interconnecting node according to claim 1, wherein said ONU unit further comprises a Clock and Data Recovery (CDR) unit arranged to determine said clock signal on a bit-level of the physical transport layer of the optical network transmissions such that a bit-level clock signal is obtained.

3. The interconnecting node according to claim 1, wherein said ONU unit further comprises a PON framer circuitry arranged to determine said clock signal from a downstream framing structure of the physical transport layer of the optical network transmissions such that a frame-level clock signal is obtained.

4. The interconnecting node according to claim 1, wherein said ONU unit comprises an ONU interface having a signal output arranged to output said obtained clock signal enabling additional attached equipment and systems to be synchronized using the obtained clock signal.

5. The interconnecting node according to claim 1, wherein said PON network is a point-to-point Ethernet, a point-to-multipoint Ethernet Passive Optical Network (EPON), or a Gigabit-capable Passive Optical Network (GPON); and wherein said copper wire xDSL access network is an ADSL-, a ADSL2-, a ADSL2plus- or a VDSL2-network.

6. A method for use in an interconnecting node comprising an optical network unit (ONU) arranged to be connected to an optical line termination (OLT) over a passive optical network (PON), and at least one xDSL access device connectable to at least one user end xDSL equipment over a copper wire xDSL access network the method comprising the steps of:
    receiving optical network transmissions in the ONU unit;
    obtaining a clock signal from the rate of bits or frames of the received optical network transmissions in the ONU unit; and
    distributing said clock signal to a timing reference input of the at least one xDSL access device;
    wherein said timing reference input of the at least one xDSL access device is a Network Timing Reference (NTR) input on a transceiver chip in an xDSL Transmission Unit-Central (xTU-C);
    wherein, when the xDSL access device and the ONU unit are implemented in separate boxes and connects via an Ethernet-interface, said clocking interconnect between the ONU unit and the xDSL access device is either a separate copper connection or an inband signal via an Ethernet link; and
    wherein the ONU unit is arranged to receive a time-of-day (ToD) information and a zero-distance equalization delay ($T_{eqD}$) from the OLT, determine a propagation delay ($T_p$), and update the received time-of-day information using the determined propagation delay.

7. The method according to claim 6, wherein the step of obtaining the clock signal uses a continuous-mode bit-level modulated transmission signal of a physical transport layer of the optical network transmissions in order to obtain said clock signal.

8. The method according to claim 6, wherein the step of obtaining the clock signal uses a downstream framing structure of a physical transport layer of the optical network transmissions in order to obtain said clock signal.

9. An interconnecting node comprising an optical network unit (ONU) arranged to be connected to an optical line termination (OLT) over a passive optical network (PON);
    wherein the ONU unit is arranged to receive a time-of-day (ToD) information and a zero-distance equalization delay ($T_{eqD}$) from the OLT termination, determine a propagation delay ($T_p$), and update the received time-of-day information using the determined propagation delay; and
    wherein said ONU unit is further arranged to determine the propagation delay according to $$T_p = \frac{1}{2} \cdot (T_{eqD} - EqD - T_{res}), \text{ wherein}$$

$T_{eqD}$ is the zero-distance equalization delay received from the OLT termination,
EqD is an assigned equalization delay of the ONU unit, and
$T_{res}$ is a response time of the ONU unit.

* * * * *